United States Patent Office 3,478,022
Patented Nov. 11, 1969

---

3,478,022
4-SUBSTITUTED AMINOPROPYL-4H-THIENO [2,3-b][1,4]BENZOTHIAZINES
Jany Renz, Basel, Jean-Pierre Bourquin, Magden, Aargau, Hans Winkler, Basel, Pierre Gagnaux, Allschwil, Simon Guldimann and Leo Ruesch, Basel, and Gustav Schwarb, Allschwil, Switzerland, assignors to Sandoz Ltd. (also known as Sandoz A.G.), Basel, Switzerland
No Drawing. Continuation-in-part of application Ser. No. 493,257, Oct. 5, 1965. This application Oct. 18, 1967, Ser. No. 676,087
Claims priority, application Switzerland, Oct. 9, 1964, 13,165/64; Oct. 29, 1964, 14,021/64; Dec. 23, 1964, 16,632/64; Apr. 1, 1965, 4,498/65; Aug. 19, 1965, 11,699/65
Int. Cl. C07d 99/10, 93/12; A61k 27/00
U.S. Cl. 260—243                              7 Claims

ABSTRACT OF THE DISCLOSURE

The present invention provides thieno-benzothiazine derivatives of formula:

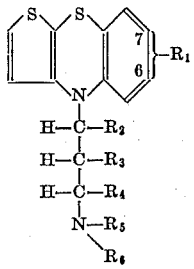

wherein either
$R_1$ is hydrogen, chlorine, bromine, alkoxy of 1 to 4 carbon atoms, alkylmercapto of 1 to 4 carbon atoms, alkylsulphonyl of 1 to 4 carbon atoms, alkylsulphinyl of 1 to 4 carbon atoms, alkanoyl of 2 to 4 carbon atoms, trifluoromethyl, or cyano,
$R_2$ is hydrogen,
$R_3$ and $R_4$ are each hydrogen or methyl, and
$R_5$ and $R_6$ together with the nitrogen atom signify 4-hydrory-piperidine, or piperazine substituted on the second nitrogen atom by 2-hydroxy-ethyl,
and pharmaceutically acceptable acid addition salts and esters thereof. The compounds show pharmacological properties typical of a sedative-neuroleptic agent.

---

This invention relates to new heterocyclic compounds and a process for their production, and this application is a continuation-in-part of our copending application Ser. No. 493,257 now abandoned.

The invention provides thieno-benzothiazine derivatives of Formula I,

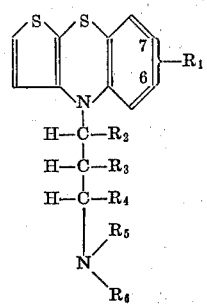

wherein either
$R_1$ is hydrogen, chlorine, bromine, alkoxy of 1 to 4 carbon atoms, alkylmercapto of 1 to 4 carbon atoms, alkylsulphonyl of 1 to 4 carbon atoms, alkylsulphinyl of 1 to 4 carbon atoms, alkanoyl of 2 to 4 carbon atoms, trifluoromethyl, or cyano,
$R_2$ is hydrogen,
$R_3$ and $R_4$ are each hydrogen or methyl, and
$R_5$ and $R_6$ together with the nitrogen atom signify 4-hydroxy-piperidine, or piperazine substituted on the second nitrogen atom by 2-hydroxy-ethyl, pharmaceutically acceptable acid addition salts and esters thereof.

The present invention further provides a process for the production of compounds of Formula I and their acid addition salts, characterized in that a compound of Formula II,

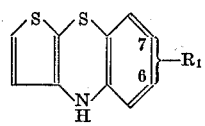

in which $R_1$ has the above significance, is condensed with a compound of Formula III, in which

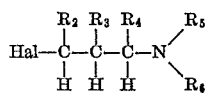

$R_2$ and $R_6$ have the above significance, and
Hal signifies a chlorine, bromine or iodine atom, in the presence of an inert organic solvent and an acid binding agent and, when in acid addition salt is required, the resulting compound of Formula I is reacted with an organic or inorganic acid.

One method of producing the compounds of Formula I is as follows:

A thieno-benzothiazine derivative of Formula II is heated under reflux for several hours with an alkali metal amide or an alkali metal hydroxide in an inert organic solvent, e.g. an aromatic hydrocarbon. A basic halide of Formula III, dissolved in a further amount of the same solvent or in another inert organic solvent, is added while boiling is continued, the reaction mixture is further heated for several hours, is subsequently cooled, washed with water and the resulting compound of Formula I is extracted with an aqueous acid solution, e.g. an aqueous tartaric acid solution. The crude base is precipitated by making the acid extract alkaline and is purified in manner known per se, e.g. by distillation in a high vacuum, chromatography and/or recrystallization and, when required, the resulting compound of Formula I is converted into its acid addition salts in manner known per se. The term "known" as used herein indicates methods in actual use or described in the literature on the subject.

Included in the present invention also is a method of producing compounds of Formula I, and their acid addition salts, which follows:

A compound of Formula V,

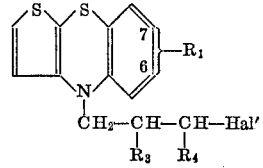

wherein $R_1$, $R_3$ and $R_4$ have the above significance, and
Hal' signifies a chlorine or bromine atom, is condensed with a compound of Formula VI,

in which $R_5$ and $R_6$ have the above significance, advantageously in the presence of an alkaline condensation agent and in an inert organic solvent, e.g. a suspension of an alkali metal carbonate in an aromatic hydrocarbon, and, when an acid addition salt is required, the resulting compound of Formula Ia is reacted with an organic or inorganic acid.

The compounds of Formula V may be produced in such a way that a compound of Formula II is reacted with 1-chloro-3-bromopropane or 1-bromo-3-iodopropane which may optionally be substituted by one or two methyl groups in the presence of an alkaline condensation agent, preferably sodium amide or sodium hydroxide, in an inert organic solvent, preferably an aromatic hydrocarbon.

As is indicated, the compounds of Formula I may be esterified. For instance, the compounds I may be reacted with a substituted benzoic acid derivative, such as trimethoxy-benzoic acid.

The thieno-benzothiazine derivatives of Formula I are bases which are viscous or crystalline at room temperature; with organic or inorganic acids they form relatively stable salts which are crystalline at room temperature. Examples of acids for acid addition salt formation with compounds of Formula I are: hydrochloric, hydrobromic, sulphuric, fumaric, maleic, tartaric and methanesulphonic acid.

The compounds of Formula II may be produced in such a way that a correspondingly substituted 2-aminothiophenol, preferably in the form of its alkali metal salt, e.g. the sodium or potassium salt, is condensed with 3-bromo-2-nitro-thiophene and the resulting compound of Formula IV,

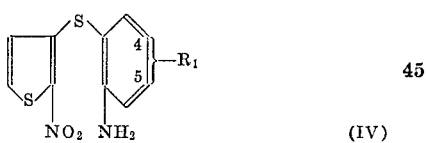

in which $R_1$ has the above significance, preferably after acylation of the primary amino group, is heated in a suspension of potassium or sodium carbonate in dimethyl formamide in the presence of copper. The intramolecular ring closure produced by this reaction is accompanied by a rearrangement which, according to the literature on the subject, has hitherto only been observed in the case of diphenyl ethers and diphenyl sulphides when it is called Smiles' rearrangement, whereby a compound of Formula II is obtained.

Substituted 2-amino-thiophenols used for producing the compounds of Formula II, some of which are unknown, may be obtained by the following method: A 2-bromo-, 2-chloro- or 2-iodo-nitrobenzene, which may be correspondingly substituted in the 4- or 5-position, is converted to the disulphide by treatment with an alkali metal sulphide and powdered sulphur in manner known per se, the resulting 2,2'-dinitro-diphenyl-disulphide, which may be substituted in the 4,4'- or 5,5'-position, is reduced in manner known per se to the corresponding 2,2'-diamino compound, the disulphide linkage is subsequently split in alcoholic solution with a strong alkali metal base and the required thiophenol derivative is liberated from the resulting alkali metal salt in manner known per se.

Compounds of Formula VII,

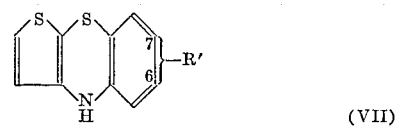

in which $R_1'$ signifies an alkylsulphinyl radical of from 1 to 4 carbon atoms inclusive, may be obtained by oxidizing a compound of Formula VIII,

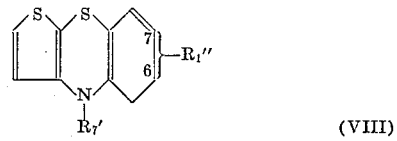

in which
$R_1''$ signifies an alkylmercapto radical of from 1 to 4 carbon atoms inclusive, and
$R_7'$ signifies an aliphatic acyl radical of from 1 to 4 carbon atoms inclusive or the benzoyl radical, with hydrogen peroxide in boiling alcoholic solution and saponifying the resulting compound of Formula IX,

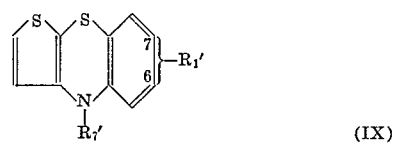

in which $R_1'$ and $R_7'$ have the above significance, by alkaline hydrolysis.

Compounds of Formula X,

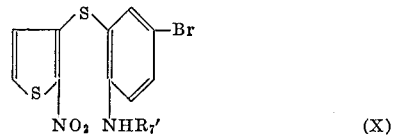

in which $R_7'$ has the above significance, may be produced in that a compound of Formula XI,

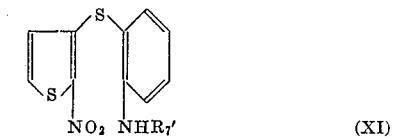

in which $R_7'$ has the above significance, is brominated with elementary bromine in manner known per se.

The compounds of Formula I are useful because they possess pharmacological activity in animals. In particular, the compounds are useful as sedative-neuroleptic agents as is indicated by their ability to evoke catalepsy, potentiate barbiturate narcosis, inhibit motor activity, conditioned avoidance response, and emotional reaction, such as in mice or rats.

For the above-mentioned use, the dosage will, of course, vary depending on the compound employed, mode of administration and treatment desired. However, in general, satisfactory results are obtained when administered at a daily dosage of from about 1 to about 10 milligrams per kilogram of animal body weight, preferably given in divided doses 1 to 3 times a day or in sustained release form. For the larger mammals, the total daily dosage is in the range of from about 20 milligrams to about 200 milligrams, and dosage forms suitable for oral administration comprise from about 5 milligrams to about 20 milligrams of the compound admixed with a solid or liquid pharmaceutical carrier or diluent.

The compounds of Formula I are indicated for use as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are as follows:

For tablets and dragées: Lactose, starch, talc and stearic acid;
For syrups: Solutions of cane sugar, invert sugar and glucose;
For injectable solutions: Water, alcohols, glycerin and vegetable oils;
For suppositories: Natural or hardened oils and waxes.

The preparations may furthermore contain suitable preserving, stabilizing and wetting agents, solubilizers, sweetening and coloring substances and flavorings.

The present invention thus further provides pharmaceutical compositions containing, in addition to a physiologoically acceptable carrier, a compound of Formula I and/or an acid addition salt thereof which is physiologically acceptable.

In the following non-limitative examples all temperature are indicated in degrees centigrade. The melting points are corrected.

As may be seen from Formula I, Ia, II and V, the substituent $R_1$ may be in the 6- or 7-position of the thieno-benzothiazine nucleus and in the compounds of Formula IV in the 4- or 5-position of the benzene ring.

The salts of naphthalene-1,5-disulphonic acid of benzene-sulphonic acid are called nadisylate or besylate in the following examples.

EXAMPLE 1

4-{3-[4-(2-hydroxyethyl)-piperazinyl]-propyl-1}-4H-thieno[2,3-b][1,4]benzothiazine (a) 3 - [1 - (2-hydroxyethyl)-piperazyl-4]-1-chloropropane.—A mixture of 75 g. of 1-(2-hydroxyethyl)-piperazine, 45.5 g. of 1-chloro-3-bromo-propane and 250 cc. of benzene is heated to 40° while stirring for 24 hours. After cooling, the precipitated hydrobromide is filtered off and the filtrate is concentrated in a vacuum at a bath temperature of 40°, whereby the compound mentioned in the heading is obtained. 3-[4-(2-hydroxyethyl)-piperazyl-4]-1-chloropropane dihydrochloride has a decomposition point of 218–222°.

(b) 4 - {3-[4-(2-hydroxyethyl)-piperazinyl]-propyl-1}-4H-thieno[2,3-b][1,4]benzothiazine.—A mixture of 30.0 g. of 4H-thieno[2,3-b][1,4]benzothiazine, 23.4 g. of finely pulverized sodium hydroxide and 150 cc. of toluene is boiled for half an hour while stirring at a bath temperature of 150° with a water separator and a solution of 36.2 g. of 3-[4-(2-hydroxyethyl)-piperazinyl]-1-chloropropane in 25 cc. of toluene is added dropwise during the course of half an hour. After boiling for a further 3 hours, cooling is effected, washing out is effected twice, each time with 50 cc. of water and subsequently extraction is effected with 250 cc. of 15% aqueous tartaric acid solution. The tartaric acid extract is washed out twice, each time with 50 cc. of benzene, is made alkaline with 65 cc. of concentrated sodium hydroxide solution and the precipitated base is extracted with 150 cc. of benzene. After washing out the benzene extract with 50 cc. of water, drying over potassium carbonate and evaporation are effected. The evaporation residue is distilled in a high vacuum and the main fraction which distils at 235–240° and 0.01 mm. of Hg is collected. The fumarate is produced in that 16.28 g. of the distillate and 10.58 g. of fumaric acid are dissolved at the boil in 500 cc. of absolute ethanol and the solution is then cooled well.

After recrystallizing twice, each time from 500 cc. of absolute ethanol, pure 4-{3-[4-(2-hydroxyethyl)-piperazinyl] - propyl - 1}-4H-thieno[2,3-b][1,4]benzothiazine fumarate, having a melting point of 157–159°, results.

EXAMPLE 2

6-chloro-4-{3-[4-(2-hydroxyethyl)-piperazinyl]-propyl-1}-4H-thieno[2,3-b][1,4]benzothiazine The condensation reaction and working up are effected in a manner analogous to that described in Example 1(b), whereby the following amounts are used: 20.0 g. of 6-chloro-4H-thieno[2,3-b]benzothiazine, 13.4 g. of finely pulverized sodium hydroxide, 150 cc. of toluene and 20.7 g. of 3-[4-(2-hydroxyethyl)-piperazinyl]-1-chloropropane. The resulting crude base is crystallized thrice, each time from 60 cc. of acetone. Pure 6-chloro-4{3-[4-(2-hydroxyethyl)-piperazyl - 4] - propyl-1}-4H-thieno[2,3-b][1,4]benzothiazine has a melting point of 105–107°.

EXAMPLE 3

7 - chloro-4-{3-[4-(2-hydroxyethyl)-piperazinyl]-propyl-1}-4H-thieno[2,3-b][1,4]benzothiazine (a) (2-nitro-thienyl-3) - 2 - amino-5-chlorophenyl-sulphide.—A total of 36.5 g. of 3-bromo-2-nitro-thiophene is added portionwise at 60° to a solution of 28 g. of 5,5'-dichloro - 2,2' - diamino-diphenyl-disulphide (melting point 109–111°) [production see Farrington and Warburton, Austral. Journ. of Chemistry, 8, 549 (1955), wherein, however, the compound is described as 2-amino-5-chloro-thiophenol] and 7.04 g. of sodium hydroxide in 130 cc. of methanol and the mixture is then kept at 60° for half an hour. Cooling, filtration and drying are effected. After recrystallizing twice, each time from a 4-fold quantity of ethylene chloride, pure (2-nitro-thienyl-3) - 2 - amino-5-chlorophenyl-sulphide, having a melting point of 158–160°, is obtained.

(b) (2 - nitro-thienyl-3)-2-acetamido-5-chlorophenyl-sulphide.—10.8 g. of acetic anhydride are added dropwise during the course of 5 minutes to a boiling mixture of 15.0 g. of (2-nitro-thienyl-3)-2-amino-5-chlorophenyl-sulphide in 45 cc. of toluene and boiling is subsequently effected for one hour. After cooling well, filtration and washing out with toluene are effected. After crystallizing from an 85-fold quantity of 80% ethanol, pure (2-nitro-thienyl-3)-2-acetamido-5-chlorophenyl-sulphide, having a melting point of 183–185°, is obtained.

(c) 7 - chloro-4H-thieno[2,3-b][1,4]benzothiazine.—A mixture of 15.0 g. of (2-nitro-thienyl-3)-2-acetamido-5-chloro-phenyl-sulphide, 15.0 g. of finely pulverized potassium carbonate, 1 g. of copper bronze and 120 cc. of dimethyl formamide is heated in a nitrogen gas stream at an oil bath temperature of 150° for 15 minutes, i.e. until nitrogen monoxide evolution stops. The reaction mixture is poured on 500 cc. of water whilst warm, is cooled, filtered off and dried. The crude material is extracted in a Soxhlet apparatus for 3½ hours with 600 cc. of ether. After evaporating the ether extract, the residue is recrystallized once from chloroform and twice from methanol. The resulting, pure 7-chloro-4H-thieno[2,3-b][1,4]benzothiazine has a melting point about 167° with slow decomposition (indefinite).

(d) 7-chloro - 4 - {3-[4-(2-hydroxyethyl)-piperazinyl]-propyl-1}-4H-thieno[2,3-b][1,4[benzothiazine.—The condensation reaction and working up are effected in a manner analogous to that described in Example 10(b), whereby the following amounts are used: 20.0 g. of 7-chloro-4H-thieno[2,3-b][1,4-]benzothiazine, 13.4 g. of finely pulverized sodium hydroxide, 150 cc. of toluene and 20.7 g. of 3 - [4-(2-hydroxyethyl)-piperazinyl]-1-chloropropane. The resulting crude base is chromatographed on a column of silica gel. 20 g. of the base are dissolved in 100 cc. of benzene and adsorbed on 400 g. of silica gel. The first eluates, i.e. 900 cc. of benzene eluate and 2000 cc. of benzene +5% methanol eluate, are discarded and the following 2000 cc. of benzene +5% methanol eluate are evaporated. The dimaleate is produced in that 6.35 g. or the evaporation residue and 3.78 g. of maleic acid are dissolved at the boil in 80 cc. of absolute ethanol and the solution is subsequently cooled. After recrystallizing twice, each time from 80 cc. of 90% ethanol, pure 7-chloro-4-{3 - [4 - (2 - hydroxyethyl)-piperazinyl]-propyl-1}-4-H-thieno[2,3-b][1,4]benzothiazine dimaleate, having a decomposition point of 162–164°, is obtained.

EXAMPLE 4

6-chloro - 4 - [2-methyl-3-(4-hydroxy-piperidyl-1)-propyl-1]-4H-thieno[2,3-b][1,4]benzothiazine (a) (2-nitro-thienyl-3) - 2 - amino-4-chlorophenyl-sulphide.—A total of 250 g. of 3-bromo-2-nitro-thiophene (melting point 81–83°) is added portionwise at 60° to a solution of 192 g. of 2-amino-4-chlorothiophenol (melting point 44–46°) and 48.2 g. of sodium hydroxide in 900 cc. of methanol and the mixture is then kept at 60° for half an hour. Cooling, filtration and drying are effected. After recrystallizating twice, each time from a 3-fold quantity of ethyl acetate, pure (2-nitro-thienyl-3)-2-amino-4-chlorophenyl-sulphide, having a melting point of 165–167°, is obtained.

(b) (2 - nitro-thienyl-3)-2-acetamido-4-chlorophenyl-sulphide.—192 g. of acetic anhydride are added dropwise during the course of 5 minutes to a boiling mixture of 267 g. of (2-nitro-thienyl-3)-2-amino-4-chlorophenyl-sulphide in 800 cc. of toluene and the mixture is subsequently boiled for one hour. After cooling well, filtration and washing out with toluene are effected. After crystallizing from a 10-fold quantity of acetone, pure (2-nitro-thienyl-3)-2-acetamido-4-chlorophenyl-sulphide, having a melting point of 178–181°, is obtained.

(c) 6 - chloro-4H-thieno[2,3-b][1,4]benzothiazine.—A mixture of 96.5 g. of (2-nitro-thienyl-3)-2-acetamido-4-chlorophenyl-sulphide, 85 g. of finely pulverized potassium carbonate, 5 g. of copper bronze and 650 cc. of dimethyl formamide is heated in a nitrogen gas stream at an oil bath temperature of 150° for 40 minutes, i.e. until nitrogen monoxide evolution stops. The reaction mixture is poured on 2 litres of water while warm, is cooled, filtered and dried. The crude material is extracted in a Soxhlet apparatus with 350 cc. of ether for 3½ hours. After evaporating the ether extract, the evaporation residue is recrystallized four times from chloroform and once from cyclohexane. The resulting, pure 6-chloro-4H-thieno[2,3-b][1,4]benzothiazine has a melting point of 167–170°.

(d) 6-chloro-4-(2-methyl-3-chloropropyl-1)-4H-thieno[2,3-b][1,4]benzothiazine.—100 g. of 6-chloro-4H-thieno[2,3-b][1,4] benzothiazine, 19.6 g. of finely pulverized sodium amide and 500 cc. of absolute toluene are heated to the boil at reflux at an oil bath temperature of 150° while stirring for one hour. Cooling is then effected to an internal temperature of 50° and a solution of 89.5 g. of 2-methyl-1-chloro-3-bromopropane in 100 cc. of absolute toluene is added dropwise during the course of one hour. After the dropwise addition, the reaction mixture is heated for half an hour in an oil bath at 120° and for half an hour in an oil bath at 145° and is then cooled. After washing out thrice, each time with 100 cc. of water, concentration is effected in a water jet vacuum at a final bath temperature of 90°. The crude 6-chloro-4-(2-methyl-3-chloropropyl-1) - 4H-thieno[2,3-b][1,4]beinzothiazine obtained as evaporation residue is worked up further as such.

(e) 6 - chloro-4-[2-methyl-3-(4-hydroxy-piperidyl-1)-propyl-1]-4H-thieno[2,3-b][1,4]benzothiazine.—A mixture of 103 g. of crude 6-chloro-4-(2-methyl-3-chloropropyl-1)-4H-thieno[2,3-b][1,4]benzothiazine, 63.0 g. of finely pulverized potassium carbonate and 500 cc. of xylene is heated to the boil at reflux at an oil bath temperature of 180° while stirring for 20 hours. After cooling, washing out is effected with 400 cc. of water and then extraction is effected with 700 cc. of 15% aqueous tartaric acid solution. The tartaric acid extract is washed out twice, each time with 100 cc. of benzene, and is made alkaline with 175 cc. of concentrated sodium hydroxide solution. The precipitated oily base is taken up in 400 cc. of benzene, the benzene layer is washed out twice, each time with 75 cc. of water, is evaporated and the evaporation residue is distilled in a high vacuum. The main fraction which distills at 225–232° and 0.04 mm. of Hg is collected. The maleate is produced in that 10.7 g. of the distillate and 3.3 g. of maleic acid are dissolved at the boil in 65 cc. of absolute ethanol and cooling is then effected. After crystallizing from 50 cc. of absolute ethanol, pure 6-chloro-4-[2-methyl-3-(4-hydroxy-piperidyl-1)propyl-1]-4H-thieno[2,3-b][1,4]benzothiazine maleate, having a melting point of 137–140°, is obtained.

EXAMPLE 5

6-bromo-4-{3-[4-(2-hydroxyethyl)-piperazinyl]-propyl-1}-4H-thieno[2,3-b][1,4]benzothiazine (a) 2,2'-diamino-4,4'-dibromo-diphenyl - disulphide.—133.1 g. of hydrazine hydrate are slowly added dropwise at reflux temperature to a mixture of 195.8 g. of 2,2'-dinitro-4,4'-dibromo-diphenyl-disulphide and 1960 cc. of absolute ethanol. Boiling is subsequently effected for a further 5 hours and the reaction solution is then evaporated in a water jet vacuum at a bath temperature of 60°. The residue is recrystallized once from a 9-fold quantity of 80% aqueous ethanol and then thrice, each time from an 8-fold quantity of isopropyl alcohol. Pure 2,2'-diamino-4,4'-diabromo-diphenyl-disulphide has a melting point of 136-138°.

(b) (2-nitro-thienyl-3) - 2-amino-4-bromophenyl-sulphide.—A total of 62.4 g. of 3-bromo-2-nitro-thiophene (melting point 81–83°) are added portionwise at 60° to a mixture of 60.9 g. of 2,2'-diamino-4,4'-dibromo-diphenyl-disulphide and 12.9 g. of sodium hydroxide in 220 cc. of methanol and the mixture is then kept at 60° for half an hour. Cooling, filtration and drying are effected. After recrystallizing thrice, each time from a 9-fold quantity of trichloroethylene, pure (2-nitro-thienyl-3)-2-amino-4-bromophenyl-sulphide, having a melting point of 163–165°, is obtained.

(c) (2-nitro-thienyl-3)-2-formamido - 4 - bromophenyl-sulphide.—A mixture of 106 g. of (2-nitro-thienyl-3)-2-amino-4-bromophenyl-sulphide and 550 cc. of approximately 98% concentrated formic acid is boiled at reflux for half an hour. Cooling, filtration and drying are effected. After recrystallizing twice, each time from a 45-fold quantity of chlorobenzene, pure (2-nitro-thienyl-3)-2-formamido-4-bromophenyl-sulphide, having a decomposition point of 238°, is obtained.

(d) 6-bromo-4H-thieno[2,3-b][1,4]benzothiazine.—A mixture of 7.5 g. of (2-nitro-thienyl-3)-2-formamido-4-bromophenyl-sulphide,13.0 g. of finely pulverized potassium carbonate, 0.5 g. of copper bronze and 80 cc. of dimethyl formamide is heated in a nitrogen gas stream at an oil bath temperature of 120° for 10 minutes. The reaction mixture is poured on 0.5 litre of water while warm, is cooled, filtered off and dried. The crude material is boiled at reflux with 150 cc. of chloroform for one hour, is filtered off and the filtrate is evaporated. After crystallizing from chloroform and then twice from isopropanol, pure 6-bromo-4H-thieno[2,3-b][1,4]benzothiazine, having a melting point of 170–172°, is obtained.

(e) 6-bromo-4-{3-[4-(2hydroxyethyl)-piperazinyl]-propyl-1}-4H-thieno[2,3-b][1,4]benzothiazine.—7.0 g. of 6-bromo-4H-thieno[2,3-b][1,4]benzothiazine, 3.94 g. of finely pulverized sodium hydroxide and 50 cc. of toluene are heated to the boil at reflux with a water separator at an oil bath temperature of 150° while stirring for half an hour. A solution of 6.1 g. of 3-[4-(2-hydroxyethyl)-piperazinyl]-1-chloropropane in 10 cc. of toluene is then added dropwise during the course of half an hour and heating is effected for a further 3 hours. After cooling, washing out is effected twice, each time with 10 cc. of water, and extraction is subsequently effected with 50 cc.

of 15% aqueous tartaric acid solution. After washing the tartaric acid extract twice, each time with 10 cc. of benzene, it is made alkaline with 15 cc. of concentrated sodium hydroxide solution and the precipitated oil base is taken up in a total of 100 cc. of benzene. The benzene solution is washed twice, each time with 15 cc. of water, is evaporated and the evaporation residue is chromatographed on a column of silica gel. 1.78 g. of the evaporation residue are dissolved in 10 cc. of benzene and adsorbed on 35 g. of silica gel. The first eluates, i.e. 250 cc. of benzene, 600 cc. of benzene +2% of methanol and 150 cc. of benzene +5% of methanol, are discarded and the following 250 cc. of benzene +5% methanol and 325 cc. of benzene +10% of methanol eluates are evaporated.

The dimaleate is produce in that 0.32 g. of the evaporation residue and 0.172 g. of maleic acid are dissolved at the boil in 10 cc. of absolute ethanol and cooling is then effected. After crystallizing from 13 cc. of absolute ethanol, pure 6-bromo-4-{3-[4-(2-hydroxyethyl)-piperazinyl[-propyl-1}-4H-thieno[2,3-b][1,4]benzothiazine dimaleate, having a decomposition point of 157–159°, is obtained.

EXAMPLE 6

6-trifluoromethyl-4-{3-[4-(2-hydroxyethyl)-piperazinyl]-propyl-1}-4H-thieno[2,3-b][1,4]benzothiazine (a) 2,2'-diamino-4,4'-ditrifluoromethyl - diphenyl-disulphide.—323 g. of hydrazine hydrate are slowly added dropwise at reflux temperature to a mixture of 488.76 g. of 2,2'-dinitro-4,4'-ditrifluoromethyl-diphenyl - disulphide and 900 cc. of absolute ethanol. Boiling is subsequently effected for a further 5 hours. The reaction solution is evaporated in a water jet vacuum at a bath temperature of 80°, 900 cc. of water are added to the residue and extraction is effected with a total of 1500 cc. of chloroform. After washing out the chloroform solution with 200 cc. of water, the solution is evaporated and the evaporation residue is distilled in a high vacuum. The main fraction which distils at 140–156° and 0.02 mm. of Hg is collected. After recrystallizing 4 times, each time from a 15-fold quantity of n-hexane, pure 2,2'-diamino-4,4'-ditrifluoromethyl - diphenyl - disulphide, having a melting point of 77–78°, is obtained.

(b) (2-nitro-thienyl-3)-2-amino - 4 - trifluoromethyl-phenyl-sulphide.—A total of 235 g. of 3-bromo-2-nitro-thiophene (melting point 81–83°) is added portionwise at 60° to a solution of 217.7 g. of 2,2'-diamino-4,4'-ditrifluoromethyl-diphenyl-disulphide and 45.2 g. of sodium hydroxide in 1100 cc. of methanol and the mixture is then kept at 60° for half an hour. Cooling, filtration and drying are effected. After recrystallizing thrice, each time from a 10-fold quantity of 80% aqueous ethanol, pure (2-nitrothienyl-3)-2-amino-4-trifluoromethyl - phenyl-sulphide, having a melting point of 146–147°, is obtained.

(c) (2-nitro-thienyl-3) - 2-formamido-4-trifluoromethyl-phenyl-sulphide.—A mixture of 200 g. of (2-nitro-thienyl-3)-2-amino-4-trifluoromethyl-phenyl-sulphide and 267 cc. of approximately 98% concentrated formic acid is boiled at reflux for 2 hours. Cooling, filtration and drying are effected. After recrystallizing thrice, each time from a 10-fold quantity of 4-methyl-pentanol-(2), pure (2-nitro-thienyl-3)-2-formamido-4-trifluoromethyl - phenyl-sulphide, having a decomposition point of 192°, is obtained.

(d) 6-trifluoromethyl - 4H - thieno[2,3-b][1,4]benzothiazine.—A solution of 35.0 g. of (2-nitro-thienyl-3)-2-formamido-4-trifluoromethyl-phenyl-sulphide in 100 cc. of dimethyl formamide is added dropwise at an internal temperature of 140° to a mixture of 90.0 g. of finely pulverized potassium carbonate, 2.0 g. of copper bronze and 150 cc. of dimethyl formamide while stirring for 20 minutes and the mixture is immediately poured on 1.0 litre of water while warm. Cooling, filtration and drying are effected. The crude material is boiled at reflux with 500 cc. of chloroform for half an hour, is filtered off and the filtrate is evaporated. After recrystallizing thrice from chloroform, pure 6-trifluoromethyl-4H-thieno[2,3-b][1,4] benzothiazine, having a melting point of 162–164°, is obtained.

(e) 6 - trifluoromethyl-4-{3-[4-(2-hydroxyethyl)-piperazinyl]-propyl-1}-4H-thieno[2,3 - b][1,4]benzothiazine.—20.0 g. of 6-trifluoromethyl-4H-thieno[2,3-b][1,4]benzothiazine, 11.7 g. of finely pulverized sodium hydroxide, 120 cc. of toluene and 18.2 g. of 3-[4-(2-hydroxyethyl)-piperazinyl]-1-chloropropane. The crude material is chromatographed on a column of silica gel. 16.8 g. of the base are dissolved in 100 cc. of benzene and adsorbed on 325 g. of silica gel. The first eluates, i.e. 750 cc. of benzene and 4250 cc. of benzene +2% of methanol, are discarded and the following 3.2 litres of benzene +2% methanol and 2.7 litres of benzene +4% methanol eluates are evaporated.

The dimaleate is produced in that 12.36 g. of the evaporation residue and 6.77 g. of maleic acid are dissolved at the boil in 120 cc. of absolute ethanol and cooling is then effected. After crystallizing from 500 cc. of absolute ethanol, pure 6-trifluoromethyl-4-{3-[4-(2-hydroxyethyl)-piperazinyl]-propyl-1}-4H-thieno[2,3 - b][1,4]benzothiazine dimaleate, having a decomposition point of 163–165°, is obtained.

What is claimed is:

1. A compound of the fromula:

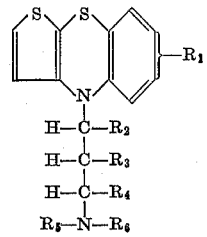

wherein either $R_1$ is hydrogen, chlorine, bromine alkoxy of 1 to 4 carbon atoms, alkylmercapto of 1 to 4 carbon atoms, alkylsulphonyl of 1 to 4 carbon atoms, alkylsulphinyl of 1 to 4 carbon atoms, alkanoyl of 2 to 4 carbon atoms or trifluoromethyl, $R_2$ is hydrogen, $R_3$ and $R_4$ are each hydrogen or methyl, and $R_5$ and $R_6$ together with the nitrogen atom signify 4-hydroxy - piperidine, or 4-(2-hydroxy-ethyl)-piperazine, or a pharmaceutically acceptable acid addition salt thereof.

2. 4-{3 - [4 - (2 - hydroxyethyl)-piperazinyl]-propyl-}-4H-thieno[2,3-b][1,4]benzothiazine.

3. 6-chloro-4-{3-[4-(2-hydroxyethyl)-piperazinyl]-propyl-1}-4H-thieno[2,3-b][1,4]benzothiazine.

4. 7-chloro-4-{3-[4-(2-hydroxyethyl)-piperazinyl]-propyl-1}-4H-thieno[2,3-b][1,4]benzothiazine.

5. 6-chloro-4-[2-methyl-3-(4-hydroxy-piperidyl-1)-propyl-1]-4H-thieno[2,3-b][1,4]benzothiazine.

6. 6-bromo-4-{3-[4-(2-hydroxyethyl)-piperazinyl]-propyl-1}-4H-thieno[2,3-b][1,4]benzothiazine.

7. 6 - trifluoromethyl-4-{3-[4-(2-hydroxyethyl)piperazinyl]-propyl-1}-4H-thieno[2,3-b][1,4]benzothiazine.

References Cited

UNITED STATES PATENTS

| 3,306,897 | 2/1967 | Renz et al. | 260—268 X |
| 3,314,948 | 4/1967 | Renz et al. | 260—243 |
| 3,349,087 | 10/1967 | Renz et al. | 260—243 |

OTHER REFERENCES

Neth. appl. 6,513,059 4(1966) abstracted in chem. abstr. vol. 65, col. 15401-2 (1966).

DONALD G. DAUS, Primary Examiner

U.S. Cl. X.R.

260—268, 294.7, 329, 515, 521, 562, 578, 646, 652, 687; 424—246